Dec. 4, 1923.
M. ARENDT
1,476,575
DYNAMO ELECTRIC MACHINE
Filed June 1, 1920
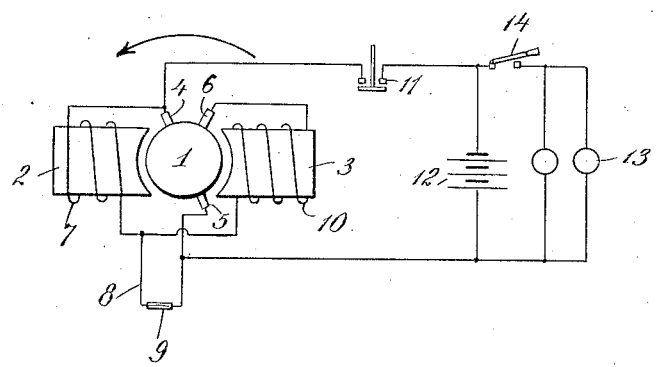
Morton Arendt, Inventor
By his Attorneys
Pennie, Davis, Marvin & Edmonds Patented Dec. 4, 1923.

1,476,575

UNITED STATES PATENT OFFICE.

MORTON ARENDT, OF NEW YORK, N. Y.

DYNAMO-ELECTRIC MACHINE.

Application filed June 1, 1920. Serial No. 385,476.

*To all whom it may concern:*

Be it known that I, MORTON ARENDT, a citizen of the United States, residing at New York city, in the county of New York, State of New York, have invented certain new and useful Improvements in Dynamo-Electric Machines; and I do hereby declare the following to be a full, clear, and exact description of the invention, such as will enable others skilled in the art to which it appertains to make and use the same.

This invention relates to dynamo-electric machines of the so-called third brush type. In my Patent No. 1,237,272, issued August 21, 1917, there is shown a dynamo-electric machine in which the potential between the main brushes is divided by an auxiliary or third brush so associated with the main brushes that armature conductors in the neutral zone are included between the auxiliary brush and the leading main brush, while armature conductors in the active zone are included between the auxiliary brush and the trailing main brush, with the result that as either the speed of the armature or the armature current increases the potential difference between the auxiliary brush and the leading main brush will progressively increase while the potential difference between the auxiliary brush and the trailing main brush will correspondingly diminish and may even fall to zero and reverse. By exciting the main field by this last named potential difference, a generator is obtained which has the characteristic that, after the normal output has been reached, the voltage generated will not further increase with increase of speed, but may even fall abruptly after a certain speed has been reached. This disadvantage may be overcome by utilizing the increasing voltage between the auxiliary brush and the leading main brush to supplement the excitation due to the decreasing voltage between the auxiliary brush and the trailing main brush, by providing a sectionalized but electrically continuous exciting winding connected at its extremities to the main brushes in the ordinary shunt relation, and connected at an intermediate point to the auxiliary brush.

In a generator such as is shown in my patent and described above, the section of the field winding connected between the leading main brush and the auxiliary or third brush is not particularly effective as a flux-producing winding at low speeds, due to the low potential impressed across its terminals. It is only when the armature reactions become pronounced that the effect of this winding becomes appreciable. In other words, the main dependence for magnetization at low speeds and current loads is placed upon the field winding that is connected between the auxiliary brush and the trailing main brush, and the increasing magnetic strength of the other winding, as the speed of the armature increases, is effective to keep the current up as the speed passes the top load point.

It is an object of this invention to provide a generator particularly adapted for charging a storage battery which shall "cut in" and commence to charge the battery at lower speeds than will a generator of the type shown in my patent and described above. A further object of the invention is to provide a generator which shall produce a greater decrease in charging current at speeds above the "top load" value than does the generator of my patent.

In accordance with the invention the field coils consist of two windings, one of which is connected between the auxiliary brush and the trailing main brush, and the other of which is connected across the main brushes and is therefore energized by the full voltage of the machine at all times, so that the generator will "cut in" and begin to charge the battery at a lower speed. Since this winding is connected directly across the brushes the voltage of the battery is impressed upon it so that its strength does not increase over the same range as does the coil of my patented construction, which is connected between the leading main brush and the auxiliary brush. Furthermore, the winding that is connected between the auxiliary brush and the trailing main brush becomes weaker at high speeds with the result that the current produced by the generator will tend to fall off when the speed exceeds a critical value.

In order more clearly to illustrate the particular nature of the invention and other objects and advantages thereof, there is shown in the accompanying drawing a diagrammatic representation of a generator embodying the invention. This generator consists of an armature 1 and field cores 2 and 3. 4 and 5 represent the main brushes and 6 the auxiliary or third brush. Connected to the main brush 4 is one terminal of the field winding 7 of core 2. The other terminal of this winding is connected to a conductor 8 which leads through a fuse 9 to the other main brush 5. The field winding 10 of core 3 is connected between the auxiliary brush 6 and the conductor 8. The circuit including winding 7 should be of higher resistance than that including winding 10. In practice, it has been found that excellent results are obtained when they are approximately the ratio of two to one. This difference in resistance may be secured by using wire of different gauges for the two windings, or by inserting in series with winding 7 a resistance which should preferably be adjustable in order that the ratio between the two paths of the double circuit field winding may be altered if desired.

The work circuit is taken off of the main brushes 4 and 5 and includes an automatic switch 11 of any suitable construction and a storage battery 12 adapted to supply lamps or other translating devices 13 controlled by a switch 14.

In the operation of the generator described above, the winding 7 will be subject to the full voltage of the armature at all times and will consequently produce an increased energization of its core which will result in the generator "cutting in" and beginning to charge the battery when it is rotating at a lower speed than in the case of a field winding connected between the leading main brush and the auxiliary brush as in my prior patent. Due to the fact, however, that the battery voltage is applied across the terminals of winding 7, its effect does not increase over the same range as does the coil of my patent, and consequently as the field winding 10 becomes weaker with increased speeds the resultant effect will be a diminishing field strength and decreasing voltage of the machine, which will prevent overcharging of the battery as the speed of the machine increases.

From the foregoing description and illustrative diagram of a simple arrangement in which the several features of this invention are illustrated, the true nature and scope of my invention will be understood. The description has been restricted to a two pole machine for the sake of simplicity, but, as all electrical engineers will understand, the invention may be embodied in multipolar machines as suggested in my hereinbefore mentioned Patent No. 1,237,272. As has been pointed out hereinbefore, the showing of a preferred embodiment is purely diagrammatic, and it is not intended that the scope of the appended claims shall be limited to the particular arrangement illustrated and described.

I claim:

1. A dynamo-electric machine comprising an armature provided with a commutator, main brushes advanced in the direction of rotation for collecting the current from the commutator, an auxiliary brush and one of said main brushes located in the same neutral zone on opposite side of the geometrical neutral axis and a sectionalized field winding having one portion connected in shunt between the main brushes and the other portion connected between the auxiliary brush and the main brush in an opposite neutral zone.

2. A dynamo-electric machine comprising an armature provided with a commutator, main brushes advanced in the direction of rotation for collecting the current from the commutator, an auxiliary brush and one of said main brushes located in the same neutral zone on opposite sides of the geometrical neutral axis and a double circuit field winding having one path connected in shunt between the main brushes, and the other path connected between the auxiliary brush and the trailing main brush, the path between the main brushes having a greater electrical resistance than the path between the auxiliary brush and the trailing main brush.

3. A dynamo-electric machine comprising an armature provided with a commutator, main brushes advanced in the direction of rotation for collecting the current from the commutator, an auxiliary brush and one of said main brushes located in the same neutral zone on opposite sides of the geometrical neutral axis and a double circuit field winding having one path connected in shunt between the main brushes, and the other path connected between the auxiliary brush and the trailing main brush, the path between the main brushes having an electrical resistance substantially twice that of the path between the auxiliary brush and the trailing main brush.

In testimony whereof I affix my signature.

MORTON ARENDT.